R. V. HASTINGS.
TIRE PROTECTOR.
APPLICATION FILED JAN. 19, 1912. RENEWED SEPT. 18, 1913.
1,077,275.
Patented Nov. 4, 1913.
2 SHEETS—SHEET 1.
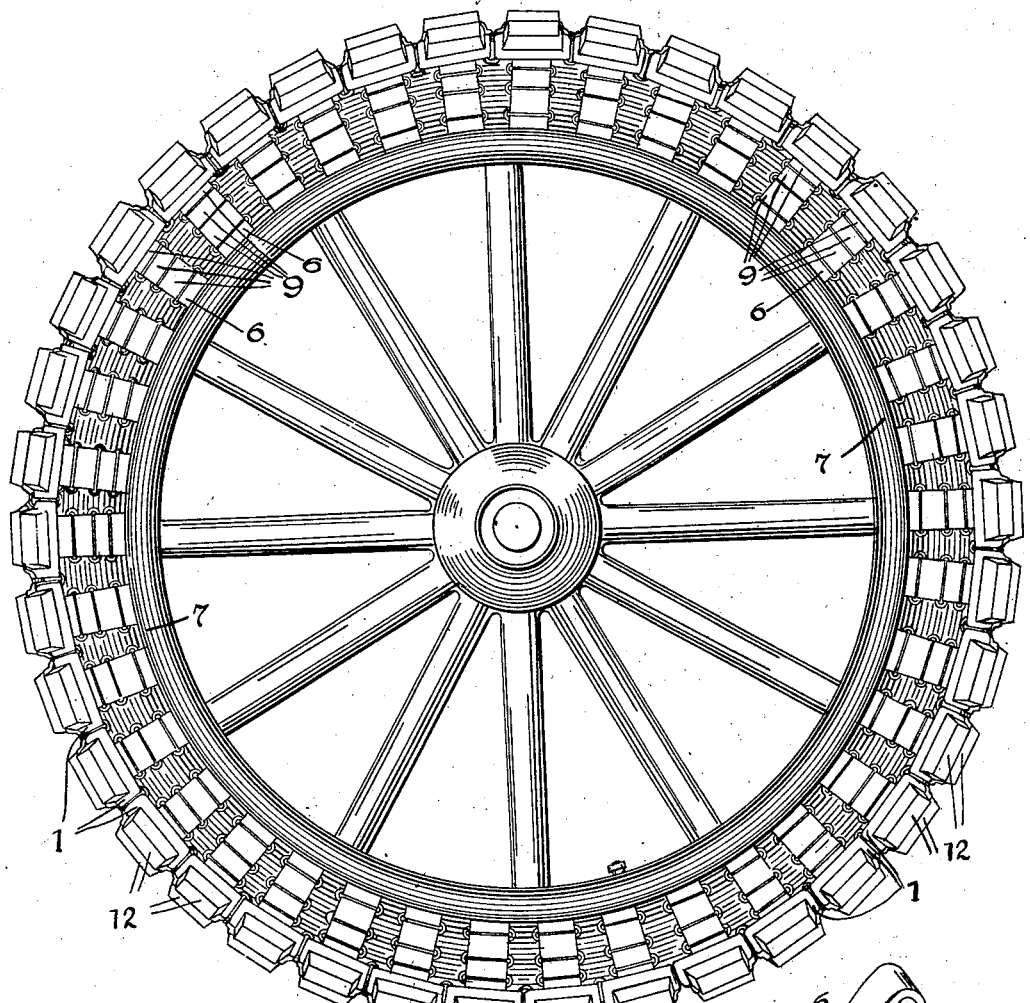
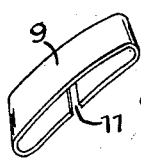
Fig. 2.
Fig. 1.
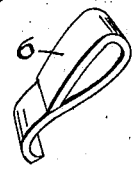
Fig. 3.
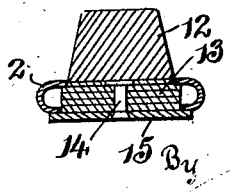
Fig. 8.
Witnesses:
Inventor
Ralph V. Hastings
By
His Attorney R. V. HASTINGS.
TIRE PROTECTOR.
APPLICATION FILED JAN. 19, 1912. RENEWED SEPT. 18, 1913.

1,077,275.

Patented Nov. 4, 1913.
2 SHEETS—SHEET 2.

Witnesses:
J. E. Titus
B. G. Richards

Inventor
Ralph V. Hastings
By Joshua R. H. Potts
His Attorney

UNITED STATES PATENT OFFICE.

RALPH V. HASTINGS, OF CHICAGO, ILLINOIS.

TIRE-PROTECTOR.

1,077,275.   Specification of Letters Patent.   Patented Nov. 4, 1913.

Application filed January 19, 1912, Serial No. 672,172. Renewed September 18, 1913. Serial No. 790,581.

*To all whom it may concern:*

Be it known that I, RALPH V. HASTINGS, a citizen of the United States, and a resident of the city of Chicago, county of Cook, and State of Illinois, have invented certain new and useful Improvements in Tire-Protectors, of which the following is a specification.

My invention relates to improvements in tire protectors and has for its object the provision of a construction of this character which is simple and efficient in operation.

The invention consists in the combinations and arrangements of parts hereinafter described and claimed.

Figure 4:
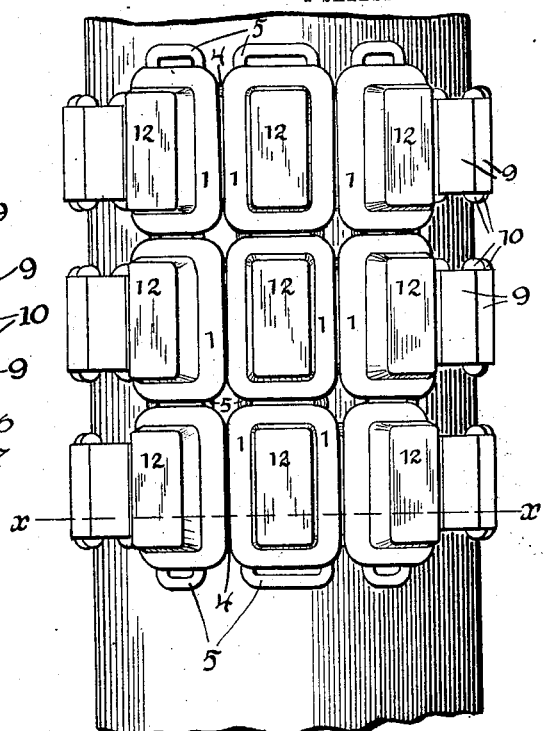
Figure 5:
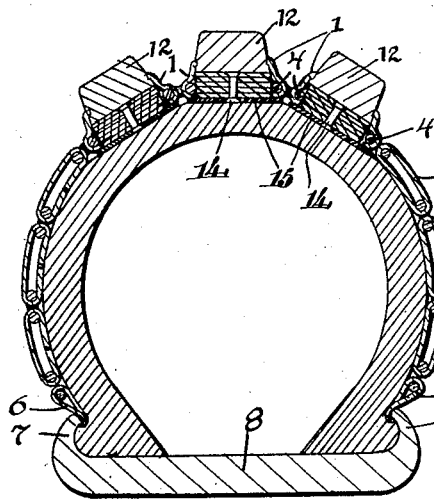
Figure 6:
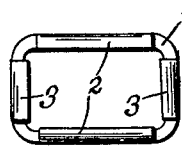
Figure 7:
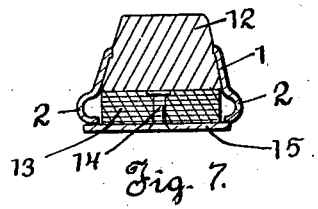

The invention will be best understood by reference to the accompanying drawings forming a part of this specification, and in which, Figure 1 is a side elevation of a wheel equipped with a tire protector embodying my invention, Fig. 2, a perspective view of one of the links employed in the construction, Fig. 3, a perspective view of one of the hooks employed in the construction, Fig. 4, an enlarged elevation of a portion of the tire and protector, Fig. 5, a section taken on line x—x of Fig. 4, Fig. 6, a bottom plan view of one of the holder members employed in the construction, Fig. 7, a cross section of a holder member and tread, Fig. 8, a cross section of a holder member and tread.

The preferred form of construction as illustrated in the drawings comprises holder members 1, which are provided at their sides with hook flanges 2 and their ends with hook flanges 3. Side flanges 2 on the different holder members are connected together by means of links 4 and end flanges 3 are connected together by means of links 5 thus assembling the holder members in rows and columns adapted to encompass the periphery of a tire. Hook members 6 are provided for the engagement with the rim flanges 7 of the ordinary form of tire rim 8 as shown in Fig. 5. Each of the rows of holder members 1 is connected with a corresponding hook 6 by means of a chain or band formed of flat links 9 and cylindrical links 10, as shown. Links 9 are formed of a sheet metal strip having its ends abutting each other on the inside of the link as indicated at 11 in Fig. 2. By this arrangement the pressure of the link on the tire will tend to hold said links in closed position.

Each of the holder members 1 carries a tread member inserted from the inside and consisting of an outer rubber block 12 and an inner canvas base 13. Canvas base 13 is made up of a series of layers of canvas secured together by rivets 14 and vulcanized together and to blocks 12. For heavy trucks the tread blocks are also provided with a metallic bearing plate 15 secured thereto by rivets 14, as indicated.

By this arrangement it will be observed that the protector may be readily assembled or taken apart and that the tread blocks may be readily renewed when worn. The protector also constitutes an admirable non-skidding device.

In Fig. 8 I have illustrated a form of holder member adapted for lighter loads and in which the entire rubber tread block 12 is exposed.

While I have illustrated and described the preferred forms of construction for carrying my invention into effect, these are capable of variation and modification without departing from the spirit of the invention. I, therefore do not wish to be limited to the precise details of construction set forth, but desire to avail myself of such variations and modifications as come within the scope of the appended claims.

Having described my invention what I claim as new and desire to secure by Letters Patent is:

1. The combination of a tread block comprising a resilient tread portion and a firm base portion made up of layers of fabric vulcanized together; a metallic plate riveted to the under side of said fabric; a holder having flanges engaging the edges and ends of said resilient tread block, said firm base block and said metallic plate; and supporting loops on said holder, substantially as described.

2. A tire tread comprising a plurality of holders; supporting loops on said holders; links in said loops securing said holders together; resilient tire blocks, each comprising a tread portion of resilient material and a firm base portion composed of layers of fabric vulcanized together and a metallic plate riveted to the under side of such firm base portion; and flanges on said holders engaging the edges and ends of said tire blocks, substantially as described.

In testimony whereof I have signed my name to this specification in the presence of two subscribing witnesses.

RALPH V. HASTINGS.

Witnesses:
  HELEN F. LILLIS,
  JOSHUA R. H. POTTS.